(12) United States Patent
Harvey et al.

(10) Patent No.: US 9,481,218 B2
(45) Date of Patent: Nov. 1, 2016

(54) DUAL TRAILER SYSTEM AND CONVERTIBLE TRAILER ADAPTABLE THERETO

(71) Applicant: 9306-6801 QUÉBEC INC., Quebec (CA)

(72) Inventors: Sylvain Harvey, Quebec (CA); Christian Pichette, Quebec (CA)

(73) Assignee: 9306-6801 QUÉBEC INC., Québec, QC ( * ) Notice: Subject to any disclaimer, the term of this patent is extended or adjusted under 35 U.S.C. 154(b) by 0 days.

(21) Appl. No.: 14/797,786

(22) Filed: Jul. 13, 2015

(65) Prior Publication Data

US 2016/0009150 A1    Jan. 14, 2016

Related U.S. Application Data

(60) Provisional application No. 62/023,356, filed on Jul. 11, 2014.

(51) Int. Cl.
| | |
|---|---|
| *B60D 1/07* | (2006.01) |
| *B60D 1/44* | (2006.01) |
| *B60D 1/48* | (2006.01) |
| *B62D 53/00* | (2006.01) |

(52) U.S. Cl.
CPC .............. *B60D 1/481* (2013.01); *B62D 53/005* (2013.01)

(58) Field of Classification Search
CPC ........ B60D 1/07; B60D 1/1675; B60D 1/44; B62D 53/06; B62D 53/061; B62D 53/065; B62D 53/067
USPC ............ 280/901, 441.2, 417.1, 416.1, 418.1, 280/425.2, 482, 411.1, 408, 410
See application file for complete search history.

(56) References Cited

U.S. PATENT DOCUMENTS

| | | | | |
|---|---|---|---|---|
| 1,858,769 A | * | 5/1932 | Erskine .................. | B62D 53/08 105/159 |
| 1,880,123 A | * | 9/1932 | Davis ....................... | B60D 5/00 280/408 |
| 2,832,610 A | * | 4/1958 | Le Tarte .............. | B62D 53/068 180/7.1 |
| 3,774,940 A | * | 11/1973 | Merritts ............. | B62D 53/0871 280/408 |
| 3,848,896 A | * | 11/1974 | Dennis ............... | B62D 53/0828 280/423.1 |
| 3,877,714 A | | 4/1975 | Black | |
| 4,021,074 A | | 5/1977 | Heiser | |

(Continued)

FOREIGN PATENT DOCUMENTS

| | | | | | |
|---|---|---|---|---|---|
| DE | 9207201 | * | 5/1992 | ............... | B60D 1/07 |
| DE | 102012015556 | * | 2/2014 | ............. | B62D 53/08 |

*Primary Examiner* — Anne Marie Boehler
(74) *Attorney, Agent, or Firm* — Norton Rose Fulbright Canada LLP; Alexandre Daoust

(57) ABSTRACT

The dual trailer system adapted to be towed by a pick-up truck having a fifth wheel on a bed thereof, the dual trailer system comprising: a lead trailer having a wheeled frame with a gooseneck-mounted kingpin at a front end thereof, for coupling to the fifth wheel of the pick-up truck, and a lead trailer fifth wheel at the rear of the lead trailer; a tail trailer having a wheeled frame with a tail trailer kingpin at a front end thereof, the primary trailer hitch having a kingpin matching the lead trailer fifth wheel for attachment thereto. The lead trailer can have an extendible portion at the rear to allow selectively extending and retracting the fifth wheel for use together with or independently from the tail trailer, and the tail trailer can also be usable independently from the lead trailer such as by way of an additional coupler which can also be provided on an extendible frame.

2 Claims, 6 Drawing Sheets

(56) References Cited

U.S. PATENT DOCUMENTS

| | | | | |
|---|---|---|---|---|
| 4,030,171 A * | 6/1977 | Arguin | ............... | B62D 53/0864 280/408 |
| 4,262,923 A * | 4/1981 | Weir | ................... | B62D 53/068 280/404 |
| 5,566,964 A * | 10/1996 | Leonard | ................... | B60D 1/07 280/416.1 |
| 6,231,065 B1 * | 5/2001 | Brown | ................... | B60D 1/155 180/7.1 |
| 2009/0160163 A1 * | 6/2009 | Gosselin | ................... | B60P 3/40 280/656 |
| 2011/0101664 A1 * | 5/2011 | Gonzalez | ........... | A63C 17/0013 280/821 |

* cited by examiner

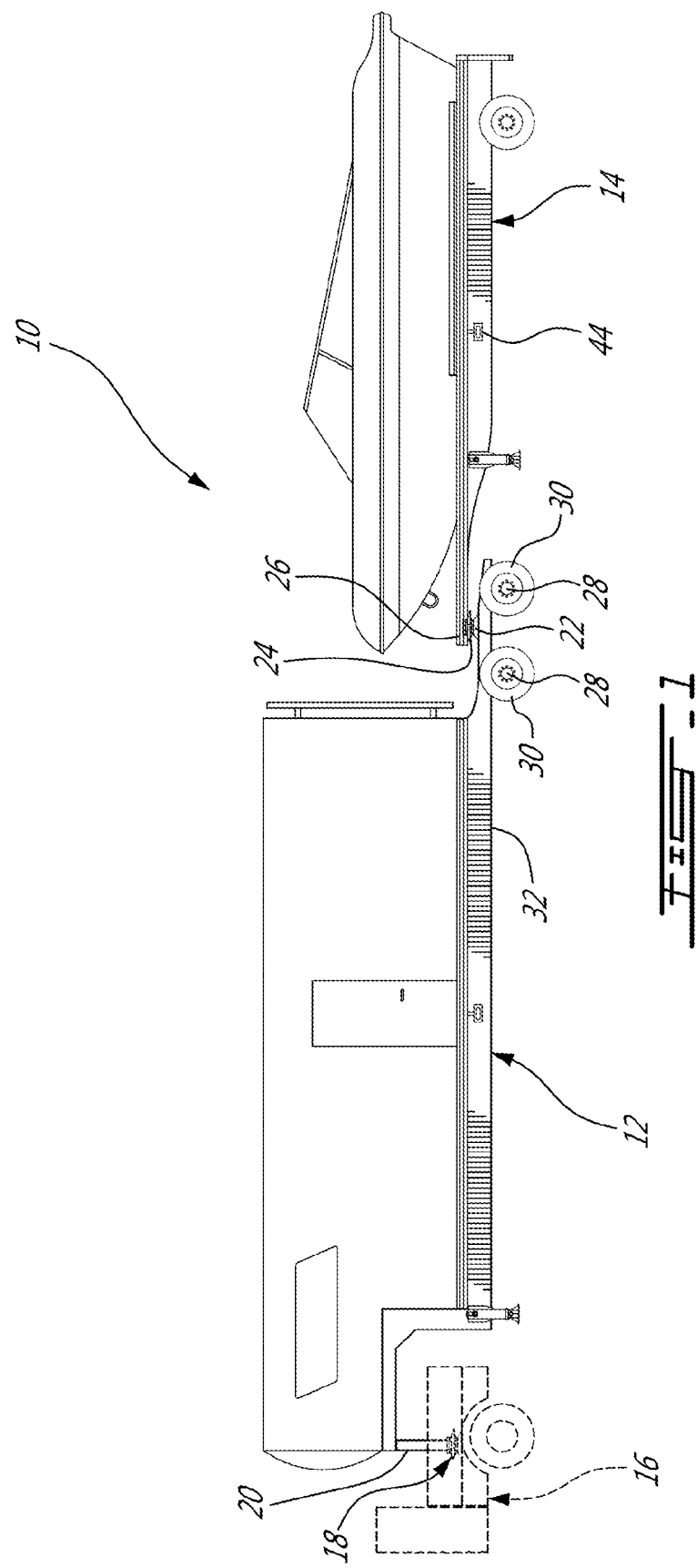

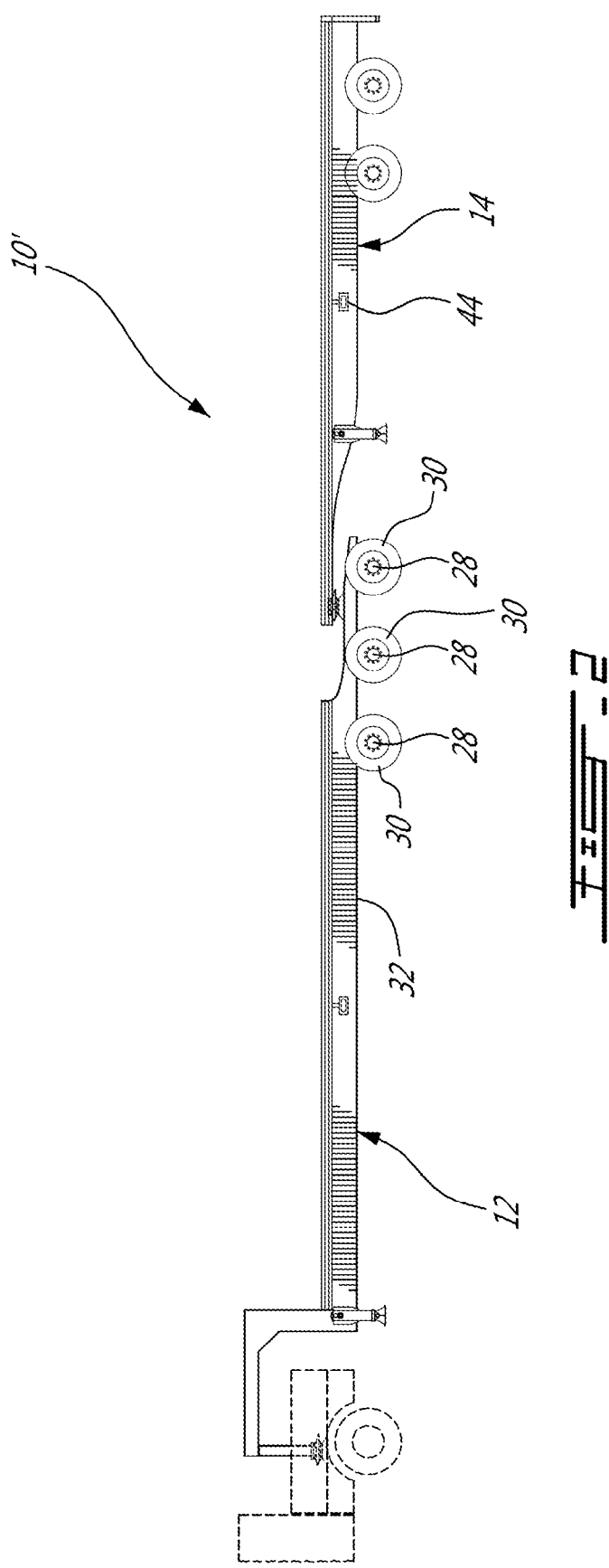

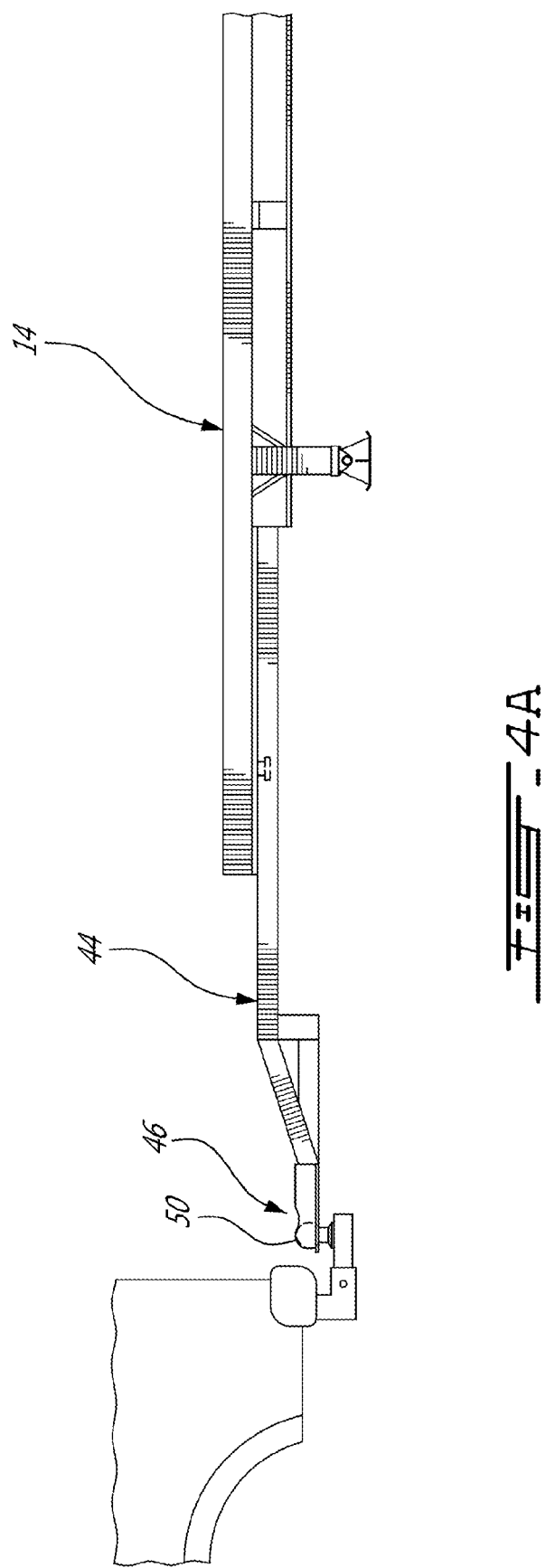

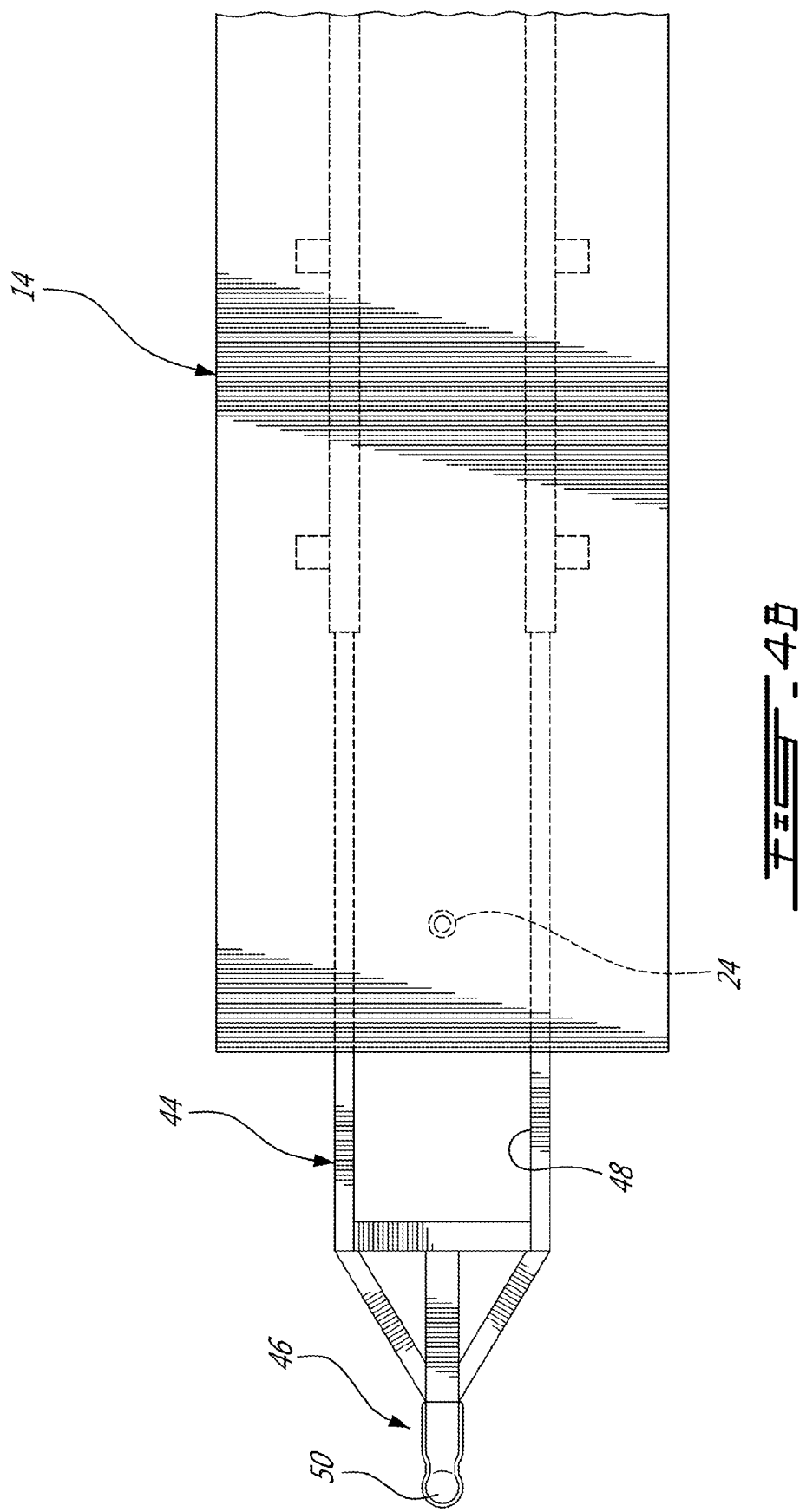

DUAL TRAILER SYSTEM AND CONVERTIBLE TRAILER ADAPTABLE THERETO

CROSS-REFERENCE TO RELATED APPLICATIONS

This application claims priority to U.S. application 62/023,356 filed Jul. 11, 2014 by applicant, the contents of which are hereby incorporated by reference.

BACKGROUND

While many trailer variations have been provided for the transport of merchandise via semi-trailer tractor trucks, there remain unaddressed needs. In particular, it was desired to increase the capacity of trailers adapted to be towed with a pickup truck.

SUMMARY

This specification discloses a dual trailer system which can be specifically adapted for towing with a pickup truck. Moreover, a design of a lead trailer and a design of a tail trailer is provided by which each trailer of the dual trailer system can be used independently of the other.

In accordance with one aspect, there is provided a dual trailer system adapted to be towed by a pick-up truck having a fifth wheel on a bed thereof, the dual trailer system comprising: a lead trailer having a wheeled frame with a gooseneck-mounted kingpin at a front end thereof, for coupling to the fifth wheel of the pick-up truck, and a lead trailer fifth wheel at the rear of the lead trailer; a tail trailer having a wheeled frame with a tail trailer kingpin at a front end thereof, the primary trailer hitch having a kingpin matching the lead trailer fifth wheel for attachment thereto.

In accordance with another aspect, there is provided a convertible trailer having a wheeled frame with a kingpin at a front end thereof, the kingpin being securable to a fifth wheel coupling; and a secondary trailer coupler.

In accordance with another aspect, there is provided a lead trailer for use with a pickup truck and a tail trailer in a dual trailer system, the lead trailer comprising a wheeled frame having a gooseneck-mounted kingpin at the front end thereof, for coupling to the truck, and a fifth wheel coupling at the rear.

Many further features and combinations thereof concerning the present improvements will appear to those skilled in the art following a reading of the instant disclosure.

DESCRIPTION OF THE FIGURES

In the figures,

FIG. 1 is a side elevation view of a first example of a dual trailer system for a pick-up truck;

FIG. 2 is a side elevation view of a second example of a dual trailer system;

FIGS. 4A and 4B are side and top plan views, respectively, of a slidable coupler.

DETAILED DESCRIPTION

Figure 3A:
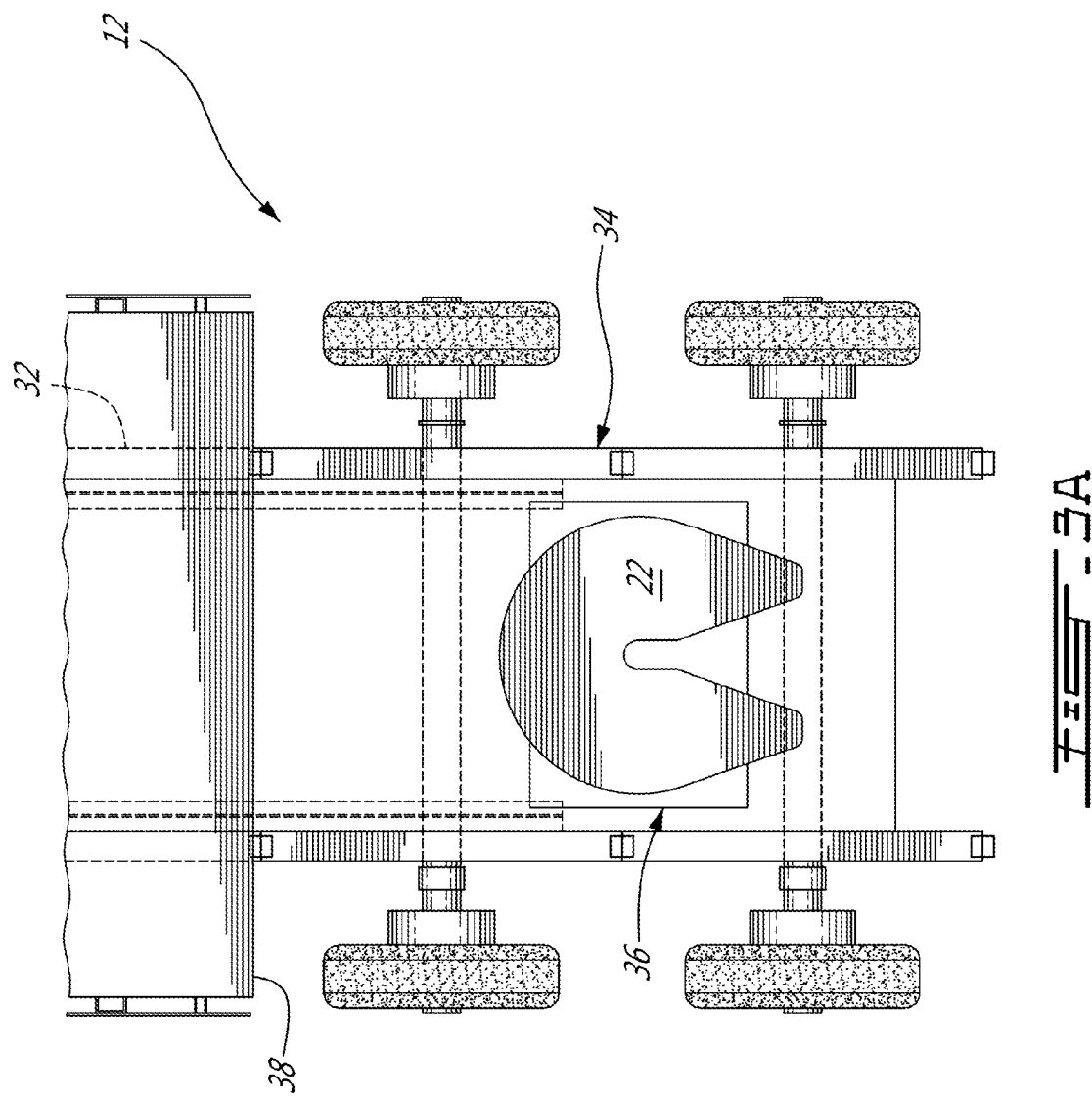
FIGS. 3A, 3B are top and rear views, respectively, of a slidable fifth wheel assembly provided at the rear of a lead trailer of a dual trailer system.

FIG. 1 shows an example of a dual trailer system 10. The dual trailer system 10 generally includes a lead trailer 12 at the front, and a tail trailer 14 at the rear, with the tail trailer 14 shown removably coupled to the lead trailer 12.

In this example, the dual trailer system 10 is specifically adapted to be mounted to a pickup truck 16 having a fifth wheel coupling 18 mounted in its bed. More specifically, the lead trailer 12 is coupleable to the fifth wheel of the pickup truck 16 via a king pin 20 mounted to a cantilevered arm, or gooseneck, the cantilevered arm being made integral to the wheeled frame of the lead trailer 12. The tail trailer 14 is also coupleable to the lead trailer 12 via a fifth wheel coupling with a lead trailer fifth wheel 22 being provided at the tail of the lead trailer 12 and a tail trailer king pin 24 protruding downwardly from a front end 26 of the wheeled frame of the tail trailer 14.

In the example shown in FIG. 1, the lead trailer 12 is embodied in the form of a mobile home or travel trailer, whereas the tail trailer 14 is used to tow a boat.

FIG. 2 shows an alternate example of a dual trailer system 10'. In the example shown in FIG. 2, both the lead trailer 12 and the tail trailer 14 are flat bed trailers intended for use in heavy duty work. It will also be noted that the trailers in FIG. 2 have a different number of axles than the trailers in FIG. 1. Many other variants are possible.

Figure 3B:
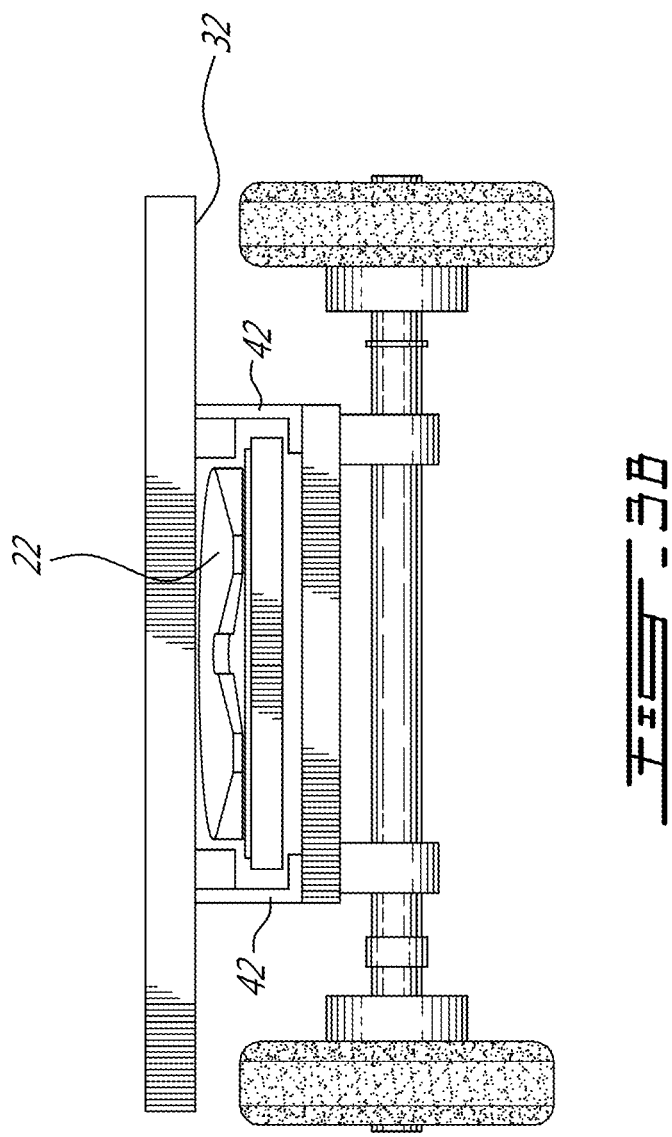

In the example shown in FIG. 1, the axles 28 of the lead trailer 12 are fixed relatively to the lead trailer 12. In an alternate example, in order to allow more flexibility in using the lead trailer 12 independently from the tail trailer 14, the axles 28 of the lead trailer can be mounted on a carriage being slidably mounted to a main frame 32 of the lead trailer 12 in a manner to be extendible selectively extendible and retractable relative to the main frame 32. Such an example is shown in greater detail in FIGS. 3A and 3B, where, the wheels 30 of the lead trailer 12 are provided on an extendible frame portion 34, more particularly a slidable fifth wheel assembly 36 in this example, the extendible frame portion 34 being slidable relative to the main portion 32, or bed portion 38, of the lead trailer 12. The extendible frame portion 34 is shown extended in FIG. 3A, and appropriately locked into the extended position (e.g. with lock pins), in which configuration the fifth wheel 22 of the lead trailer 12 is exposed above the wheels 30 and axles 28 to receive the king pin 24 of the tail trailer 14.

Indeed, when using the lead trailer 12 alone, i.e. without the tail trailer 14, the extendible frame portion 34 extending past the bed portion 38 of the lead trailer 12 can be associated to a length of the lead trailer 12 which reduces maneuverability without adding significant use. Henceforth, retracting the extendible frame portion 34 within the main portion 32 of the lead trailer 12 can reduce the overall length of the lead trailer 12 when used alone without significantly affecting its functionality. The axles 28, their suspension, and the fifth wheel 22 can be mounted to the extendable frame portion 34 slidingly mounted to the main frame 32 of the lead trailer 12 via elongated 'L' or 'C' shaped beams 42 and thus be slidable therealong while being lockable into a given longitudinal position by suitable locks.

In the example shown in FIG. 1, the kingpin 24 of the tail trailer 14 does not have a gooseneck and is fixed relatively to the tail trailer 14. The tail trailer 14 can be provided with more flexibility in using it independently from the lead trailer 12 by providing it with an additional, secondary trailer coupler 44 which can be specifically adapted to coupling to a ball-type two hitch on a towing vehicle. In this specific embodiment, to avoid interference of the secondary coupler 44 when the kingpin 24 (or primary coupler) is used, the secondary coupler 44 is slidably mounted to the wheeled frame of the tail trailer 14 in a manner to be extendible therefrom and retractable therein.

An example embodiment having a retractable/extendible coupler are provided in FIGS. 4A and 4B where the secondary trailer coupler 44 is made part of a slidable frame portion 46 which has an elongated aperture 48 in the center. The kingpin 24 forming the trailer coupler, which will be referred to herein as 'primary' for convenience and independently of its intended relative frequency of use with the ball-type coupler, extends across the elongated aperture 48. Henceforth, the kingpin 24 does not interfere with the sliding operability of the slidable frame portion 46 and associated secondary trailer coupler 44. Moreover, when the slidable frame portion 46 is retracted, the secondary trailer coupler 44 does not interfere with the mating ability of the kingpin 24 with the fifth wheel 22 of the lead trailer 12.

In this example, the secondary tow hitch has a tow ball coupler 50, though it will be understood that another type of tow hitch can be used in in alternate embodiments, as deemed practical in view of specific embodiments.

As can be understood, the examples described above and illustrated are intended to be exemplary only. The scope is indicated by the appended claims.

What is claimed is:

1. A dual trailer system adapted to be towed by a pick-up truck having a fifth wheel on a bed thereof, the dual trailer system comprising:
   a lead trailer having a wheeled frame with a gooseneck-mounted kingpin at a front end thereof, for coupling to the fifth wheel of the pick-up truck, and a lead trailer fifth wheel at the rear of the lead trailer;
   a tail trailer having a wheeled frame with a tail trailer kingpin at a front end thereof, the kingpin matching the lead trailer fifth wheel for attachment thereto;
   wherein the tail trailer further comprises a secondary trailer coupler adapted for attachment directly to a hitch of a towing vehicle, allowing use of the tail trailer independently from the lead trailer;
   wherein the secondary trailer coupler is slidably mounted to the wheeled frame of the tail trailer and thereby selectively extendible for use directly coupled to the towing vehicle and retractable for avoiding interference with the tail trailer kingpin when coupling the tail trailer kingpin to the lead trailer fifth wheel;
   wherein the kingpin of the tail trailer extends across an elongated longitudinal opening provided in a slidable frame portion of the secondary trailer hitch and does not interfere with the sliding of the slidable frame portion.

2. A convertible trailer having a wheeled frame with a kingpin at a front end thereof, the kingpin being securable to a fifth wheel coupling; and a secondary trailer coupler;
   wherein the secondary trailer coupler is slidably mounted to the wheeled frame and thereby extendible for use directly coupled to a towing vehicle and retractable for towing of the convertible trailer by a leading trailer via the kingpin;
   wherein the kingpin of the convertible trailer extends across an elongated longitudinal opening provided in a slidable frame portion of the secondary trailer hitch and does not interfere with the sliding of the slidable frame portion.

* * * * *